(12) United States Patent
Liu et al.

(10) Patent No.: US 9,794,248 B2
(45) Date of Patent: Oct. 17, 2017

(54) ALTERNATIVE APPROACH TO DEPLOYMENT AND PAYMENT FOR DIGITAL CERTIFICATES

(75) Inventors: Quentin Liu, San Jose, CA (US); Kathleen Elizabeth Barnes, Santa Clara, CA (US); Richard F. Andrews, Menlo Park, CA (US)

(73) Assignee: Symantec Corporation, Moutain View, CA (US)

( * ) Notice: Subject to any disclaimer, the term of this patent is extended or adjusted under 35 U.S.C. 154(b) by 1083 days.

(21) Appl. No.: 12/646,515

(22) Filed: Dec. 23, 2009

(65) Prior Publication Data

US 2011/0153479 A1    Jun. 23, 2011

(51) Int. Cl.
*H04L 29/06* (2006.01)
*G06Q 30/00* (2012.01)
*G06Q 30/04* (2012.01)
*G06Q 30/06* (2012.01)

(52) U.S. Cl.
CPC ..... *H04L 63/0823* (2013.01); *G06Q 30/0185* (2013.01); *G06Q 30/04* (2013.01); *G06Q 30/06* (2013.01)

(58) Field of Classification Search
USPC ............................................ 705/34; 713/176
See application file for complete search history.

(56) References Cited

U.S. PATENT DOCUMENTS

| 5,878,141 | A | * | 3/1999 | Daly | G06Q 20/04 235/379 |
|---|---|---|---|---|---|
| 6,108,788 | A | * | 8/2000 | Moses | G06F 21/602 713/155 |
| 6,615,347 | B1 | * | 9/2003 | de Silva | H04L 9/3263 713/156 |
| 6,820,063 | B1 | * | 11/2004 | England | G06F 21/10 705/50 |
| 6,950,934 | B2 | * | 9/2005 | Kang | H04L 9/3268 713/156 |
| 7,162,635 | B2 | * | 1/2007 | Bisbee | G06Q 20/00 713/176 |
| 7,418,597 | B2 | | 8/2008 | Thornton et al. | |
| 7,653,810 | B2 | * | 1/2010 | Thornton | H04L 63/0823 713/158 |

(Continued)

*Primary Examiner* — Talia Crawley
(74) *Attorney, Agent, or Firm* — Wilmer Cutler Pickering Hale and Dorr LLP (57) ABSTRACT

A method for managing payment of digital certificates includes receiving a request to issue a digital certificate to a subscriber, capturing and saving payment information of the subscriber, performing a first authentication and verification of the subscriber at a first time, and performing at least one additional authentication and verification of the subscriber at least once every authentication period. A long-lived certificate is issued to the subscriber provided the subscriber is authenticated and verified. The long-lived certificate is valid for an expiration period. However, the long-lived certificate is revoked if (1) the additional authentications and verification produce invalid results, or (2) if payment is not received during a payment period. The authentication period is shorter than the expiration period and there are at least a first and a second authentication period within the expiration period. The expiration period is longer than the authentication period.

22 Claims, 6 Drawing Sheets

(56) References Cited

U.S. PATENT DOCUMENTS

| | | | | |
|---|---|---|---|---|
| 2002/0104000 A1* | 8/2002 | Kang | H04L 9/3268 | 713/158 |
| 2002/0129135 A1* | 9/2002 | Delany | G06F 21/41 | 709/223 |
| 2002/0138725 A1* | 9/2002 | Moses | H04L 9/3268 | 713/156 |
| 2002/0166049 A1* | 11/2002 | Sinn | G06F 21/33 | 713/175 |
| 2002/0174238 A1* | 11/2002 | Sinn | G06Q 10/06 | 709/229 |
| 2003/0097592 A1* | 5/2003 | Adusumilli | H04L 63/04 | 726/4 |
| 2004/0019564 A1* | 1/2004 | Goldthwaite | G06Q 20/04 | 705/44 |
| 2004/0139327 A1* | 7/2004 | Brown | G06F 21/34 | 713/176 |
| 2005/0081027 A1* | 4/2005 | Thornton | H04L 63/0823 | 713/156 |
| 2005/0091484 A1* | 4/2005 | Thornton | H04L 63/0823 | 713/156 |
| 2005/0114653 A1* | 5/2005 | Sudia | H04L 63/0823 | 713/158 |
| 2005/0209975 A1* | 9/2005 | So | G06F 21/606 | 705/71 |
| 2006/0031492 A1* | 2/2006 | Thayer | H04L 63/0823 | 709/225 |
| 2006/0047965 A1* | 3/2006 | Thayer | H04L 63/0823 | 713/176 |
| 2006/0059346 A1* | 3/2006 | Sherman | H04L 63/0823 | 713/175 |
| 2006/0236096 A1* | 10/2006 | Pelton | H04L 63/06 | 713/155 |
| 2007/0022469 A1* | 1/2007 | Cooper | H04K 1/00 | 726/3 |
| 2009/0187980 A1* | 7/2009 | Tung | H04L 63/0823 | 726/6 |
| 2009/0235070 A1* | 9/2009 | Trench | G06Q 20/02 | 713/157 |
| 2010/0185656 A1* | 7/2010 | Pollard | G06F 21/6245 | 707/769 |
| 2011/0126001 A1* | 5/2011 | Fu | H04L 63/0823 | 713/156 |

* cited by examiner

ALTERNATIVE APPROACH TO DEPLOYMENT AND PAYMENT FOR DIGITAL CERTIFICATES

BACKGROUND OF THE INVENTION

The present invention is related to digital certificates, and more particularly to deployment and payment of digital certificates.

In recent years e-commerce has become an important way of conducting business. However, there are still concerns among many internet users regarding how secure transactions conducted over the internet really are. One concern that users have is whether the website conducting business is a legitimate website. If a user conducts business on a website that is not legitimate, the user could easily end up being a victim of fraud, monetary theft, identity theft etc. In order for e-commerce to remain a viable alternative to traditional ways of conducting business, online transactions and connections need to be secure.

Digital certificates are used to help ensure the security of online transactions by providing a means for authenticating the identity of websites. Since websites having a digital certificate have been authenticated by a third party certification authority (CA), such as VeriSign®, a user visiting the website utilizing a digital certificate knows the website has undergone a rigid vetting process. X.509 certificates, also referred to as digital certificates, are used to authenticate websites.

Digital (X.509) certificates are defined by the Telecommunication Standardization Sector (ITU-T) of the International Telecommunication Union (ITU) as part of the Directory (X.500) series. Currently, digital certificates are issued to a subscriber (the subscriber is the owner of the website) after the subscriber requests the certificate, pays for the certificate and undergoes an authentication and verification process.

The issued digital certificates, as described by RFC 5280 (http://www.ietf.org/rfc/rfc5280.txt), contains the date at which the certificate becomes valid, and a later date at which the certificate expires. For example, a subscriber requesting an SSL certificate, from a CA, will pay the full amount up front and receive a digital certificate whose validity start date is set to the date on which the digital certificate was issued. The validity end date will typically be one, two, or three years after the validity start date.

Near the end of the validity period, the CA will notify the subscriber to renew the digital certificate, which involves the repetition of many of the same actions executed when the digital certificate was originally purchased. These actions include creating a Certificate Signing Request (CSR), submitting the CSR to the CA, giving the CA information about the technical, corporate, and billing contacts to be associated with the certificate, indicating what vendor's web server software will be used, sending payment information to the CA, waiting for the CA to authenticate and validate all the information presented to it, receiving the newly issued certificate, installing the digital certificate, and restarting the software to cause it to recognize the new digital certificate.

Figure 1:
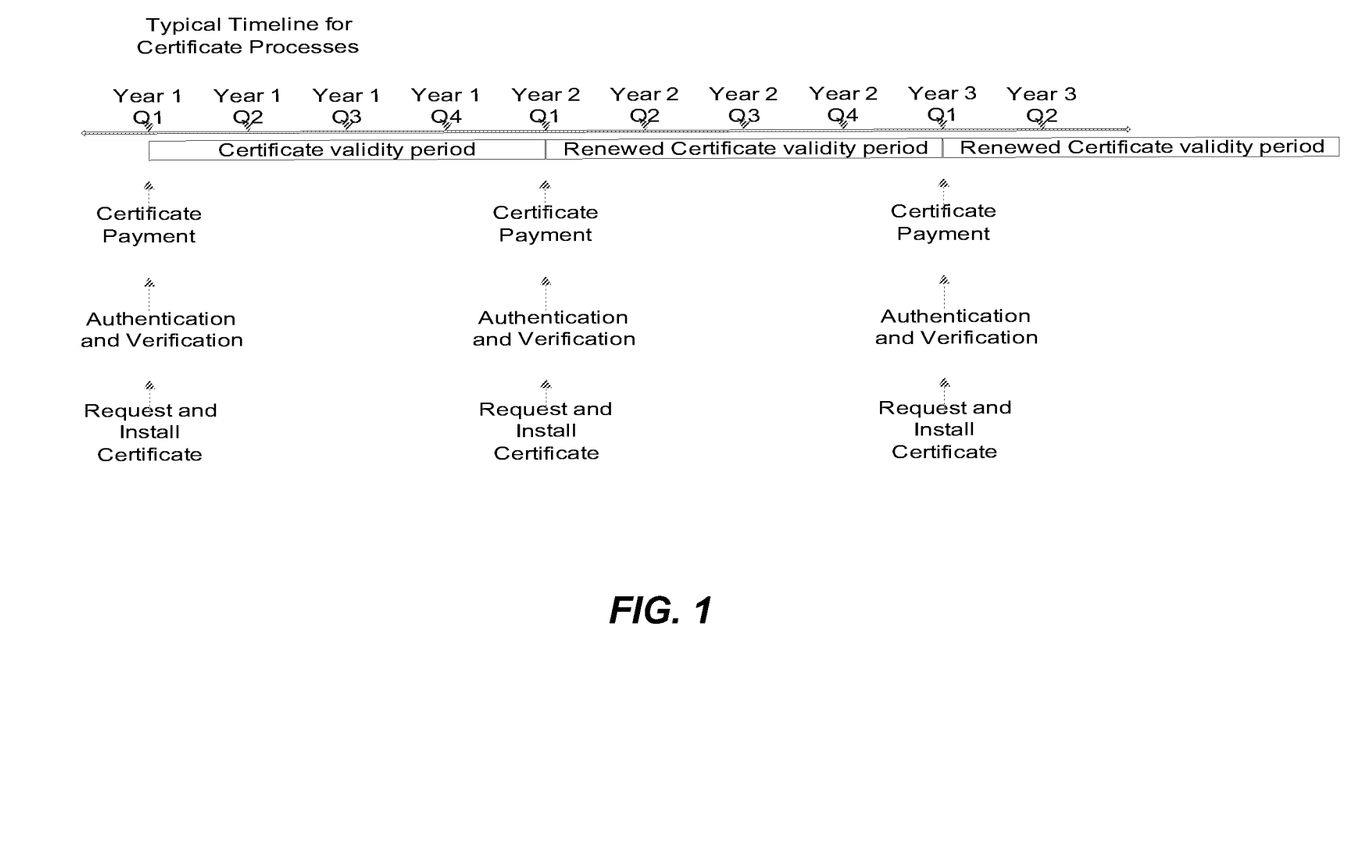
FIG. 1 is a simplified time line showing an existing life cycle of a digital certificate from issuance to revocation.

These actions, which are repeated every time a digital certificate is renewed, are strongly dependent on the end of the validity period because they all occur at the same time when the digital certificate renewal process occurs. FIG. 1 is a simplified time line showing an existing life cycle of a digital certificate from issuance to revocation.

FIG. 1 shows the life cycle of a digital certificate, which is valid for one year, starting from when the digital certificate is requested, issued and installed. The digital certificate is issued by the CA after an authentication and verification process and after payment is received by the CA. Before the end of the one-year validity period (for example 90 days before), a renewal process occurs that is identical to the process used in the previous year to issue the certificate. Similarly, before the end of the second one-year validity period (for example 90 days before), a second renewal process occurs that is again identical to the previous two renewal processes. Each time the digital certificate is renewed the same steps, which are time consuming, are repeated. The actions are repeated because all of the actions are dependent on the certificate's one-year validity period. The CA does not issue a long-lived certificate, which would allow the CA to skip the repeat of the authentication and verification processes, which are performed during the renewal process at each renewal. It is these processes that are performed during the renewal process which provides the user visiting the site the assurance the CA has done its job of authenticating and verifying the organization owning the site. These assurances allow users to trust the CA and therefore trust the information in the certificate signed by the CA.

Therefore, what is needed is a system and method for deploying, paying and renewing digital certificates that is easier and less time consuming than existing systems and methods while still enforcing the rigid authentication and verification processes necessary for issuing certificates.

BRIEF SUMMARY OF THE INVENTION

Embodiments of the invention provide methods for deployment and payment of digital certificates. Embodiments of the invention improve the process for issuing digital certificates by using a subscription model to automate actions that are normally repeated (e.g. payment, authentication, verification, and renewal requests).

According to one embodiment, a method for managing payment of digital certificates, includes receiving a request to issue a digital certificate to a subscriber, capturing and saving payment information of the subscriber, performing a first authentication and verification of the subscriber at a first time, and performing at least one additional authentication and verification of the subscriber at least once every authentication period. Upon determining that the subscriber information obtained in the first authentication and verification is authentic and valid, the CA issues a long-lived certificate to the subscriber. The long-lived certificate is valid for an expiration period. The expiration period can be predetermined. Also, upon determining that the subscriber information obtained in any of the at least one additional authentication and verification is no longer valid, the CA revokes the long-lived certificate. The long-lived certificate is revoked if payment is not received during a payment period. The authentication period is shorter than the expiration period and there are at least a first and a second authentication period within the expiration period. The expiration period is longer than the authentication period.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of the invention may be realized by reference to the remaining portions of the specification and the drawings, presented below. The Figures are incorporated into the detailed description portion of the invention.

DETAILED DESCRIPTION OF THE INVENTION

Embodiments of the invention provide methods for deployment and payment of digital certificates. Embodiments of the invention improve the process for issuing digital certificates by using a subscription model to automate actions that are normally repeated (e.g. payment, authentication, verification, and renewal requests). Typically, when a digital certificate is issued, it is only valid for one or two years and must be renewed at the end of that period by the subscriber, who must repeat the certificate request and installation process. The subscriber must also repeat the payment process and the certificate authority (CA) must repeat the authentication and verification process. Embodiments of the invention improve the renewal process by reducing the number of times the same actions are repeated by the subscriber and the CA.

In one embodiment of the invention, the subscriber submits an initial request for a certificate, and after an authentication process, the subscriber is issued a long-lived certificate, (e.g. valid for five or six years). During the initial request, the subscriber's information (i.e. name, address, account, payment information, etc) is collected. The subscriber is issued a long-lived certificate even if the subscriber requests a one or two year certificate. At a certain frequency, perhaps every 18 months, the CA repeats its authentication and verification of the information provided by the subscriber, to insure that the information is still valid. If the information remains valid, then nothing happens, except possibly payment for continued use of the certificate. If some of the information is no longer valid, then the CA revokes the certificate, and works with the subscriber to provide an updated certificate containing valid information. Both the subscriber and the CA benefit because in most cases, during the renewal process a digital certificate is only issued once every validity period (which can be 3 years, 5 years, 10 years etc.) but the behind the scenes authentication and verification is still performed automatically on a regular basis. The subscriber can always terminate the relationship if the subscriber chooses, in which case, the certificate is revoked by the CA. In some embodiments, if the subscriber chooses to terminate the certificate, the CA will not reimburse any payments made by the subscriber.

Figure 2:
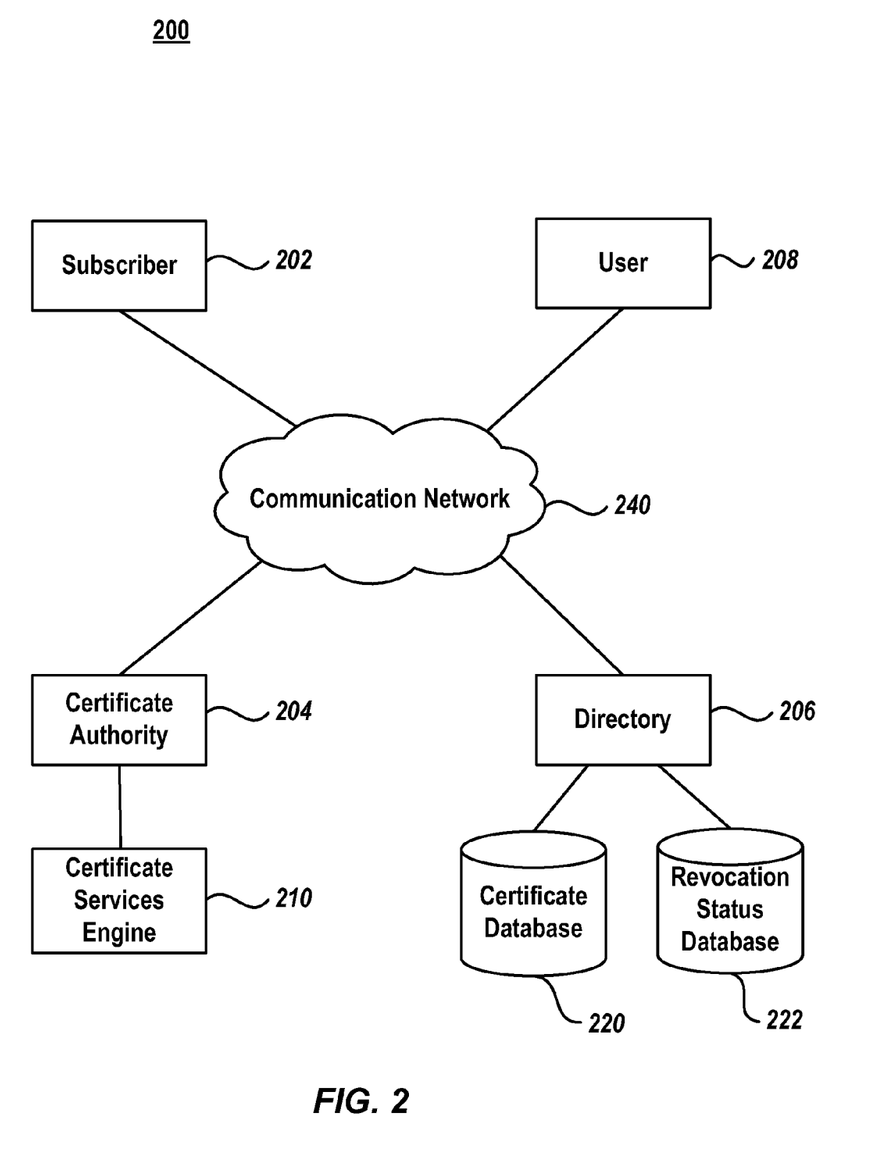
FIG. 2 is a block diagram showing a network including a certificate authority, according to an embodiment of the present invention.
Figure 3:
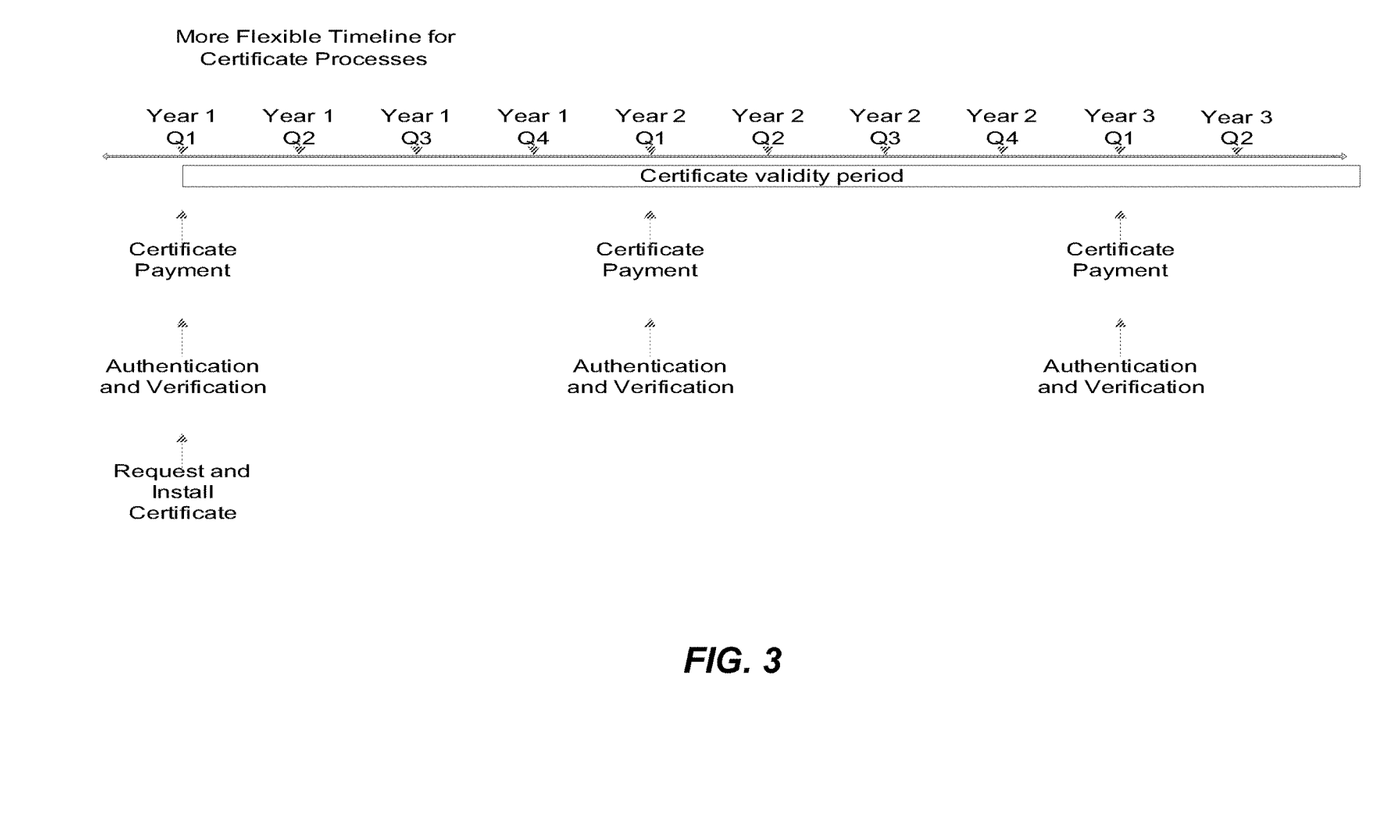
FIG. 3 is a simplified time line showing how digital certificates are issued and renewed using a subscription model, according to another embodiment.
Figure 4:
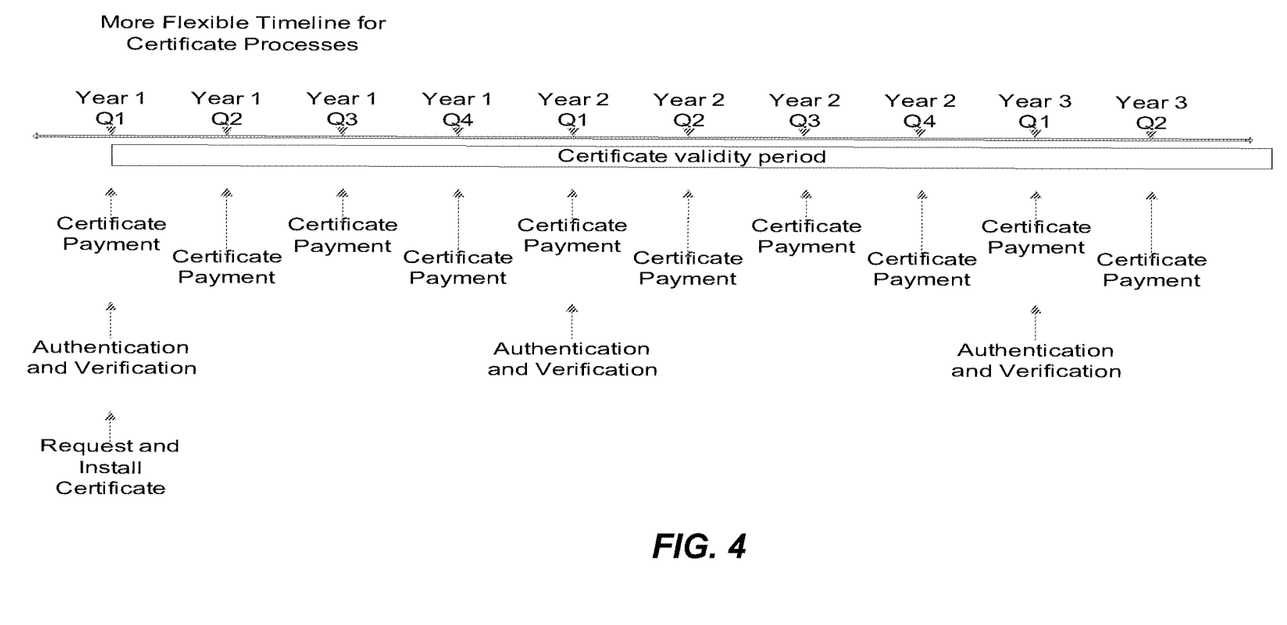
FIG. 4 is a another simplified time line showing how digital certificates are issued and renewed using a subscription model along with installment payments, according to another embodiment.

Embodiments of the invention improve the current process for issuing digital certificates by automating actions that are normally repeated (e.g. payment, authentication, verification, and renewal requests). The invention automates these actions by using a subscription model to break the dependency, which currently exists, between the renewal actions and the certificate's validity period. FIG. 2 illustrates a system using a CA that is used to carry out the improved digital certificate issuing and renewal process that reduces the dependency between the renewal actions and the certificate validity period. FIGS. 3 and 4 below, which are both illustrations showing time lines of how digital certificates are issued and renewed using a subscription model, illustrate the lack of dependence between the renewal actions when using the invention.

Authentication is the process of determining whether an entity is, in fact, who or what it is declared to be. In private and public computer networks (including the Internet), authentication is commonly done through the use of logon passwords. Knowledge of the password is assumed to guarantee that an entity is authentic. Each entity registers initially using an assigned or self-declared password. On each subsequent use, the entity must know and use the previously declared password. The password is considered a first factor, because it is something the entity knows that presumptively no one else knows. Verification is the process of checking whether the entity is authentic. This can involve a physical inspection of the entity such as calling them or going to the entity's place of business.

FIG. 2 is a block diagram of a system 200 suitable for use with the present invention. The system 200 includes a subscriber 202, a Certificate Authority (CA) 204, a directory 206, and a user 208, all of which are coupled to a communications network 240. The system 200 further includes a certificate services engine 210, a digital certificate database 220, and a revocation status database 222 such as an Online Certificate Status Protocol (OCSP) server or a certificate revocation list (CRL). The certificate services engine 210 is coupled to CA 204. The digital certificate database 220 and the revocation status database 222 are coupled to the directory 206.

The labels "subscriber", "CA", "directory", and "user" are given to describe the role which each of these entities plays with respect to digital certificates used in a public-key infrastructure (PKI). In a PKI, security is achieved by using public-key cryptography, and entities such as subscriber 202 are associated with a key pair which includes a public key and a private key. Subscriber 202 holds his private key securely and makes his public key widely available by means of a digital certificate issued by CA 204.

As used in this description, "digital certificate" means a document which associates the subscriber 202 with his public key and is digitally signed by the CA 204, using the CA's private key. A digital certificate is "digitally signed" by an CA 204 if a third party can verify that the CA 204 has signed the document and can also verify that the contents of the document have not changed since the CA 204 has signed. Preferably, this is achieved by one-way hashing the document and then encrypting the one-way hash using the CA's 204 private key to produce a digital signature included as part of the digital certificate. CA 204 uses certificate services engine 210 to issue digital certificates, as well as to possibly supply other digital certificate services.

Directory 206 is designed to facilitate efficient access to digital certificates. Once CA 204 has issued a digital certificate to subscriber 202, the digital certificate may be easily accessed from a number of places, including directory 206.

In system 200, directory 206 is coupled to a digital certificate database 220 and to a revocation status database 222. Digital certificate database 220 is a database of digital certificates, including subscriber 202's digital certificate. The revocation status database 222 is a database which contains information about the status of digital certificates and when requested for a status of a digital certificate can return a signed response signifying that the certificate specified in the request is 'good', 'revoked' or 'unknown'. If it cannot process the request, it may return an error code. Some examples of a revocation status database 222 include OCSP servers or CRLs.

User 208 is an entity which uses subscriber's 202 digital certificates, typically to authenticate that an unknown party is the specific subscriber 202 who he claims to be. For example, an unknown party might approach user 208 over communications network 240, claiming to be a specific subscriber 202. As proof of this, the unknown party might supply his digital certificate to user 208. User 208 verifies that the contents of the digital certificate have not been tampered with. Then, if user 208 trusts the CA 204 of the digital certificate, user 208 can also trust that the subscriber 202 named in the digital certificate is bound to the public key contained in the certificate. Hence, if the unknown party communicates using the corresponding private key, then user 208 can further trust that the unknown party is the subscriber 202 named in the digital certificate. If user 208 does not trust CA 204, user 208 will request CA 204's digital certificate in order to authenticate the identity of CA 204. User will repeat this process traversing up a chain of digital certificates until it reaches a CA 204 which it trusts, at which point, user 208 will have authenticated that the unknown party is subscriber 202.

In a different variation, the unknown party might not supply its digital certificate. Instead, the party may supply information about himself and user 208 might then retrieve the appropriate digital certificate from directory 206. Directory 206 retrieves the digital certificate from digital certificate database 220 and also checks the revocation status database 222 to insure that the digital certificate has not been revoked. User 208 then authenticates the identity of the unknown party, using the same procedure as described above.

In FIG. 2, subscriber 202, CA 204, directory 206, and user 208 are shown as separate entities. In fact, a single entity may play more than one role. For example, a certification authority may play the role of both CA 204 and directory 206. Alternately, the user 208 may also function as a directory 206 for digital certificates of subscribers 202 who frequent the user 208, as described previously. Entities may also take on different roles in different contexts. For example, an intermediate digital certificate authority will be a subscriber 202 with respect to the entity which issues the intermediate digital certificate authority's digital certificate but will be a CA 204 with respect to digital certificates which it issues. In addition, subscriber 202, CA 204, directory 206, and user 208 have been referred to as entities because they, in fact, may be individuals, computer servers, corporations, organizations, e-mail locations, or any other entity which may be involved in the digital certificate structure. These entities, however, will typically communicate to the communications network 240 via a computer.

In an embodiment which will be used to illustrate various aspects of the invention, communications network 240 is the Internet. User 208 is an individual accessing the Internet via a commercial browser, such as Microsoft's Internet Explorer. Subscriber 202 is a merchant with an on-line storefront, typically implemented by e-commerce software running on a server. CA 204 and directory 206 are implemented on servers by commercial vendors of digital certificate services, such as VeriSign. It should be noted that the invention may be used with systems other than those using the architecture of FIG. 2. For example, the entities 202, 204, 206, and 208 may communicate with each other over separate communications networks or dedicated communications channels, rather than through the common communications network 240 of FIG. 2. Alternately, various parts of system 200 may be implemented by mobile components and may not be permanently attached to a communications network. For example, subscriber 202 may interact with the other entities via a smart card, which may contain subscriber 202's digital certificate.

The CA 204 can include a processor that can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like. The databases 220 and 222 are memory devices that can be local or distributed as appropriate to the particular application. The databases can store information related to the certificates previously issued by the CA, program code and instructions executed by a processor, and other suitable data. For example, the databases can store historical records for each certificate issued by the CA including long-lived certificate information collected, as described in further detail with reference to FIGS. 4 and 5. The memory in the databases can include a number of memories including a main random access memory (RAM) for storage of instructions and data during program execution and a read only memory (ROM) in which fixed instructions are stored. Thus, memory in the databases provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

FIG. 3 is a simplified time line showing the issuance and renewal of digital certificates using a subscription model, according to another embodiment. FIG. 3 illustrates a long-lived certificate, which is valid for a certificate validity period, being issued when a request is received to install the certificate. The certificate is issued after a subscriber 202 is authenticated and verified by the CA 204 and after payment for the digital certificate is received by the CA 204. The issued digital certificate, which has a certificate validity period, is then installed at Year 1 Q1. In one embodiment the certificate validity period is at least three years and extends beyond Year 3 Q2. In other embodiments the certificate validity period can be five years or ten years. After one year, at approximately Year 2 Q1, the CA 204 automatically performs another authentication and verification of the subscriber 202 and receives payment for the digital certificate. If the subscriber 202 is authenticated and verified and if the CA 204 receives payment for the digital certificate, then the digital certificate remains in force. However, if the subscriber 202 is not authenticated and verified or if payment is not received, then the digital certificate is revoked and the CA 204 contacts the subscriber 202 to determine if a new digital certificate containing updated valid information should be issued. Similarly, after two years, at approximately Year 3 Q1, the CA 204 performs another authentication and verification of the subscriber 202 and receives payment for the digital certificate. If the subscriber 202 is again authenticated and verified and if the CA 204 again receives payment for the digital certificate, then the digital certificate remains in force. However, if the subscriber 202 is not authenticated and verified or if payment is not received, then the digital certificate is revoked and the CA 204 contacts the subscriber 202 to determine if a new digital certificate containing updated valid information should be issued.

The authentication and verification actions can be done automatically with minimal efforts. The payment can also be collected automatically, if desired. Since the certificate is long lived, the certificate does not expire and there is no need to do a renewal process unless the authentication and verification process shows that the information is not valid any longer. This breaks the dependency between all of the renewal actions, because the renewal actions no longer need to occur except when the certificate is being renewed.

A comparison of FIGS. 1 and 3 shows that in the embodiment of FIG. 3 there is no need to request and install a digital certificate at Year 2 Q1, after the first year has expired. Similarly, in the embodiment of FIG. 3 there is no need to request and install a digital certificate at Year 3 Q1, after the second year has expired. By eliminating the need to request and install a digital certificate every year, the process of deploying, paying and renewing digital certificates becomes much easier and less time consuming than existing systems and methods use as illustrated in FIG. 1. In the embodiment of FIG. 3, both the subscriber and the CA benefit because in most cases, during the renewal process a digital certificate is only issued once at the start of the certificate's validity period but the behind the scenes authentication and verification is still performed automatically on a regular basis over the life of the certificate provided payments have been made.

FIG. 4 is another simplified time line showing the issuance and renewal of digital certificates using another subscription model that incorporates periodic payment installments, according to another embodiment. FIG. 4 illustrates another long-lived certificate, which is valid for a certificate validity period, being issued when a request is received to install the certificate. The certificate is issued after a subscriber 202 is authenticated and verified by the CA 204 and after a first installment payment for the digital certificate is received by the CA 204. The issued digital certificate, which has a certificate validity period, is then installed at Year 1 Q1. In one embodiment the certificate validity period is at least three years and extends beyond Year 3 Q2. In other embodiments the certificate validity period can be five years or ten years. In the embodiment of FIG. 4, the certificate is paid in installments which are broken up by yearly quarter so that the user does not have to pay as much money in one lump sum when the digital certificate is originally issued. The installment payments can be set up by automatic withdrawal or some other means. After approximately the first quarter (i.e. three months) at Year 1 Q2, after the digital certificate is issued, the second payment installment is received by the CA 204. If the second payment installment is received, then the digital certificate remains in force. If the second payment installment is not received, the digital certificate can be revoked or a reminder to pay the second installment can be sent to the subscriber 202. Installment payments are similarly received once every quarter such as for example Year 1 Q3, Year 1 Q4, etc.

After one year, at approximately Year 2 Q1, the CA 204 automatically performs another authentication and verification of the subscriber 202 and receives another payment installment for the digital certificate. If the subscriber 202 is authenticated and verified and if the CA 204 receives the payment installment for the digital certificate, then the digital certificate remains in force. At this point the CA 204 can also check to determine if the subscriber 202 has made all subsequent payment installments. If the subscriber is not current in his payment installments, then the digital certificate can be revoked at this time. Further, if the subscriber 202 is not authenticated and verified or if payment installments have not been received, then the digital certificate can be revoked at this time and the CA 204 can contact the subscriber 202 to determine if a new digital certificate containing updated valid information should be issued. Similarly, after two years, at approximately Year 3 Q1, the CA 204 performs another authentication and verification of the subscriber 202 and receives payment installments for the digital certificate. If the subscriber 202 is again authenticated and verified, and if the CA 204 has received the payment installment for the digital certificate, then the digital certificate remains in force. At this point the CA 204 can again check to determine if the subscriber 202 has made all subsequent payment installments and revoke the digital certificate if the subscriber is not current in his payment installments. If the subscriber 202 is not authenticated and verified or if payment installments have not been received, then the digital certificate can be revoked and the CA 204 can contact the subscriber 202 to determine if a new digital certificate containing updated valid information should be issued.

After one year, the certificate lifetime is automatically extended by performing an authentication and verification process and receiving payment for that quarter. Similarly, after two years, the certificate lifetime is automatically extended by performing an authentication and verification process and receiving payment for that quarter. The authentication and verification actions can be done automatically with minimal efforts. If the authentication and verification actions show that the information remains valid, then payment can be collected automatically, if desired. If the authentication and verification actions show that some of the information is no longer valid, then the CA revokes the certificate, and works with the user to provide an updated certificate containing valid information. Since the certificate is long lived, the certificate does not expire and there is no need to do a renewal process unless the authentication and verification process shows that the information is not valid any longer. This breaks the dependency between all of the renewal actions, because the renewal actions no longer need to occur except when the certificate is being renewed.

A comparison of FIGS. 1 and 4 shows that in the embodiment of FIG. 4 there is no need to request and install a digital certificate at Year 2 Q1, after the first year has expired. Similarly, in the embodiment of FIG. 4 there is no need to request and install a digital certificate at Year 3 Q1, after the second year has expired. By eliminating the need to request and install a digital certificate every year, the process of deploying, paying and renewing digital certificates becomes much easier and less time consuming than existing systems and methods use as illustrated in FIG. 1. In the embodiment of FIG. 4, both the subscriber and the CA benefit because in most cases, during the renewal process a digital certificate is only issued once at the start of the certificate's validity period but the behind the scenes authentication and verification is still performed automatically on a regular basis over the life of the certificate provided payments have been made.

Figure 5:
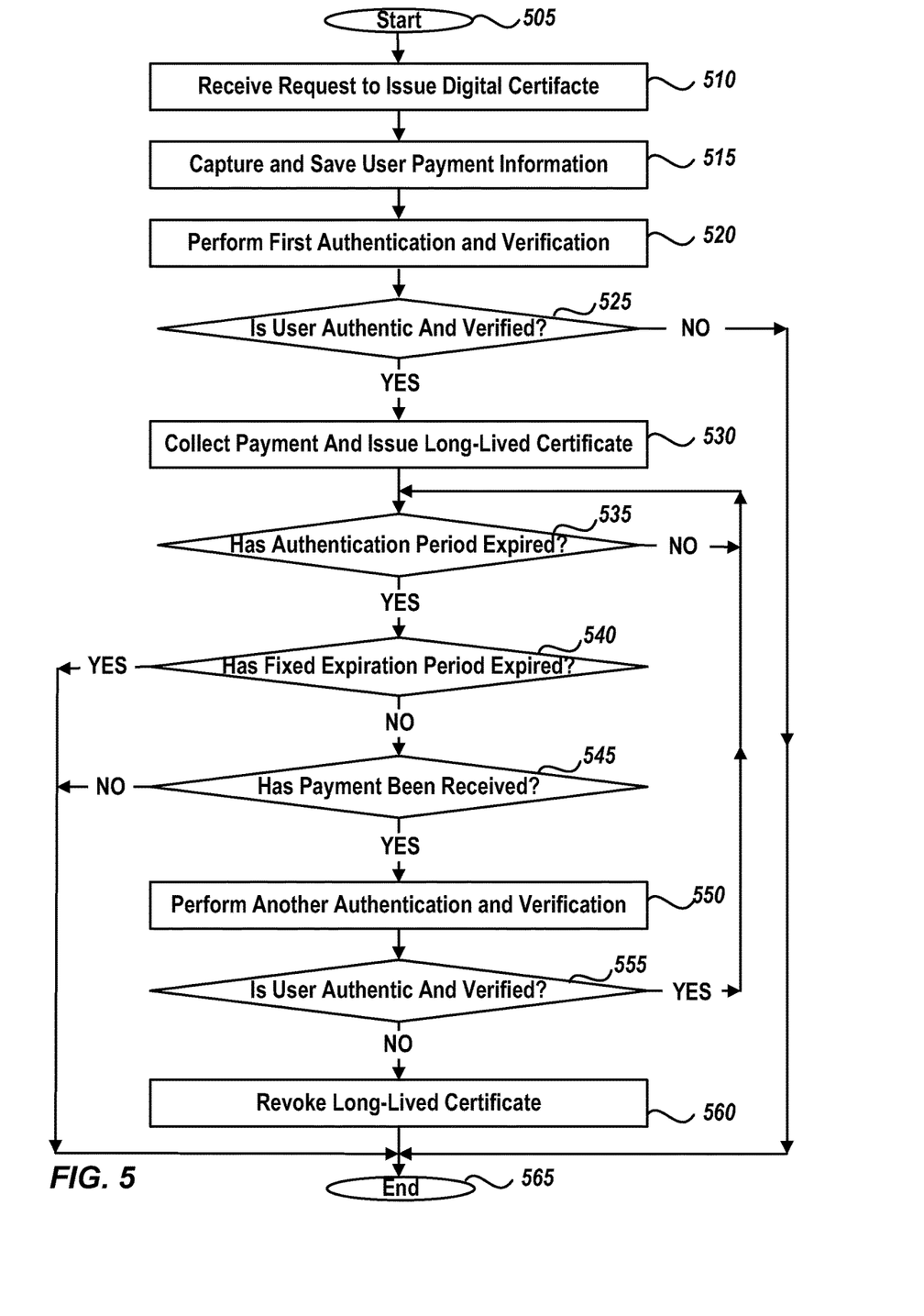
FIG. 5 is a flowchart illustrating the issuance and renewal of digital certificates, according to an embodiment of the present invention.

FIG. 5 is a flowchart illustrating operations performed to issue and renew digital certificates, according to an embodiment of the present invention. The method starts in operation 505 after a decision has been made to issue a digital certificate. The decision to issue a digital certificate is made after a subscriber 202 determines that a digital certificate is beneficial and has agreed to the price of the digital certificate. In operation 510, the CA 204 receives a request to issue a digital certificate to a subscriber 202. Next in operation 515, the CA 204 captures and saves information about the subscriber 202, including payment information. The information captured about the subscriber 202 can include location, contact person, contact address, website information, billing information, account information, etc. In operation 520, the CA 204 performs a first authentication and verification of the subscriber 202 at a first time. After the authentication and verification is performed, the CA 204 analyzes the authentication and verification results and makes a decision in operation 525 whether the subscriber 202 is authenticated and verified. If the decision in operation 525 is the subscriber 202 is authenticated and verified then payment for a long-lived certificate is collected and the long-lived certificate is issued in operation 530. The long-lived certificate is issued for a period that will expire after an expiration period. The expiration period for the long-lived certificate can vary depending on the application but is preferably at least 5 years or 10 years. If the decision in operation 525 is that the subscriber 202 is not both authenticated and verified, then the long-lived certificate is not issued and the process ends in operation 565. In operation 565, the CA 204 notifies the subscriber 202 that the long-lived certificate was not issued because the CA 204 was unable to authenticate and verify the subscriber 202.

After the long-lived certificate is issued in operation 530, at least one additional authentication and verification of the subscriber 202 is performed at least once every authentication period. The authentication period can be predetermined or it can be established during any of the operations leading up to the issuance the long-lived certificate. The authentication period can be independent of the expiration period or it can be related to the expiration period. For example, in one embodiment the expiration period of the long-lived certificate is five years beginning Jan. 1, 2010 and ending Dec. 31, 2014, and the authentication period is three months (or one quarter of a year) so that the first authentication period ends in Mar. 31, 2010, the second authentication period ends Jun. 30, 2010, etc. Although the authentication period can vary, in one embodiment the authentication period is shorter than the expiration period and there are at least a first and a second authentication period within the expiration period. Before another authentication and verification is performed, a decision is made in operation 535 whether the authentication period has expired. If the decision in operation 535 is that the authentication period has not expired then the method stays checking until the authentication period has expired. If the decision in operation 535 is that the authentication period has expired, then in operation 540 another decision is made whether the expiration period has expired. If the decision in operation 540 is that the expiration period has expired, then the process ends in operation 565. If the decision in operation 540 is that the expiration period has not expired, then in operation 545 a decision is made whether payment for the digital certificate is current. If the decision in operation 545 is that payment for the digital certificate is not current, then the digital certificate is revoked in operation 560. If the decision in operation 545 is that the payment is current, then in operation 550 another authentication and verification of the subscriber 202 is performed. The additional authentication and verification in operation 550 is only performed if (1) the authentication period has expired, which means that it is time to perform the additional authentication and verification; (2) the expiration period of the long-lived certification has not expired; and (3) payment for the digital certificate is current. Therefore, the additional authentication and verification performed in operation 550 acts to check the subscriber 202 to ensure that the subscriber 202 is still a valid subscriber 202 that the CA 204 can authenticate and verify.

Since payment can be made via various methods, payment is current if there are no outstanding balances. For example, in one embodiment the subscriber 202 can pay for the entire life of the long-lived certificate when the long-lived certificate is issued, in which case the payment would always be current. In another embodiment the subscriber 202 can elect to pay for the digital certificate in yearly installments, in which case payment would have to be made before the end of the year so that the subsequent authentications would realize that the payment was current. Payment can be made automatically such as by the CA 204 automatically withdrawing funds at a payment period. Payment can also be made by the subscriber 202 actively paying for the long-lived certificate with a check, internet payment, or credit card payment. Payment can also be made by automatically requesting payment at a payment frequency from an account number, where the account number is stored with the payment information of the subscriber 202. In some embodiments, payment for the digital certificate is required to be received before performing the first authentication and verification of the subscriber 202. In some embodiments, payment for continued use of the digital certificate can be received after performing the additional authentication and verification of the subscriber 202. In other embodiments, payment for continued use of the digital certificate is required to be received before performing the additional authentication and verification of the subscriber 202.

After the additional authentication and verification is performed in operation 550, the results of the authentication and verification are analyzed and in operation 555 a decision is made whether the subscriber 202 can still be authenticated and verified. If the decision in operation 555 is that the subscriber 202 cannot be authenticated or verified, then in operation 560 the long-lived certificate is revoked. If the decision in operation 555 is that the subscriber 202 is authenticated and verified then the process continues by going back to operation 535 where a decision is made whether the next authentication period has expired. For example, if the authentication period is three months for a long-lived certificate issued Jan. 1, 2010 having a five year expiration period, a second authentication and verification would then be done after the first authentication period which ends on Mar. 31, 2010, a third authentication and verification would be done after the second authentication period which ends on Jun. 30, 2010, etc. The method ends in operation 565 after the long-lived certificate is revoked or has expired. In operation 565, the CA 204 notifies the subscriber 202 that the long-lived certificate has been revoked or has expired. After the digital certificate is revoked, the CA can request updated information from the subscriber 202.

Figure 6:
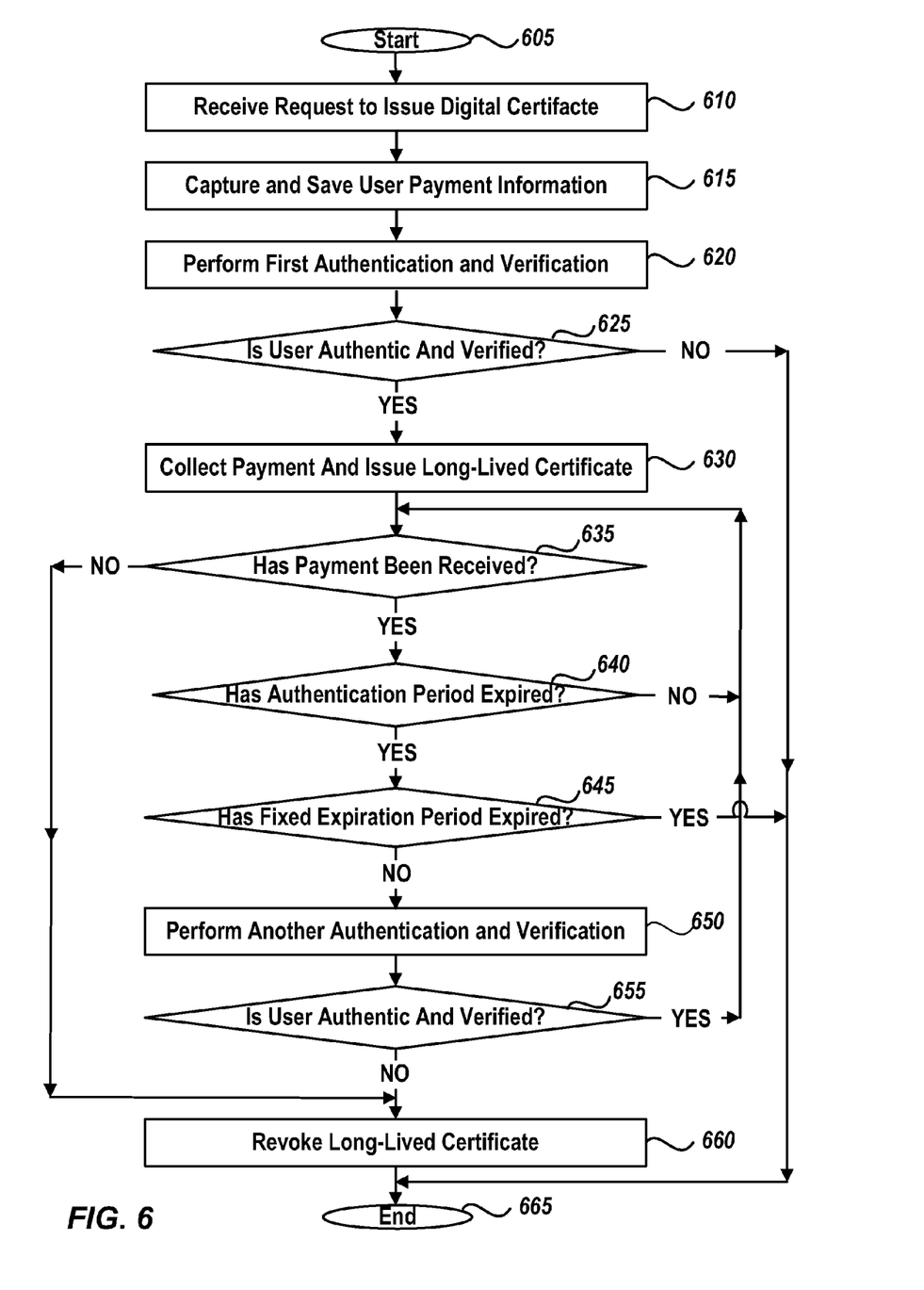
FIG. 6 is a flowchart illustrating the issuance and renewal of digital certificates when the digital certificate is paid for with installments, according to an embodiment of the present invention

FIG. 6 is a flowchart illustrating operations performed to issue and renew digital certificates when payment for the digital certificate is made in installments, according to an embodiment of the present invention. The method starts in operation 605 after a decision has been made to issue a digital certificate. The decision to issue a digital certificate is made after a subscriber 202 determines that a digital certificate is beneficial and has agreed to the price of the digital certificate. In operation 610, the CA 204 receives a request to issue a digital certificate to a subscriber 202. Next in operation 615, the CA 204 captures and saves information about the subscriber 202, including payment information. The information captured about the subscriber 202 can include location, contact person, contact address, website information, billing information, account information, etc. In operation 620, the CA 204 performs a first authentication and verification of the subscriber 202 at a first time. After the authentication and verification is performed, the CA 204 analyzes the authentication and verification results and makes a decision in operation 625 whether the subscriber 202 is authenticated and verified. If the decision in operation 625 is the subscriber 202 is authenticated and verified then payment for a long-lived certificate is collected and the long-lived certificate is issued in operation 630. The long-lived certificate is issued for a period that will expire after an expiration period. The expiration period for the long-lived certificate can vary depending on the application but is preferably at least 5 years or 10 years. If the decision in operation 625 is that the subscriber 202 is not both authenticated and verified, then the long-lived certificate is not issued and the process ends in operation 665. In operation 665, the CA 204 notifies the subscriber 202 that the long-lived certificate was not issued because the CA 204 was unable to authenticate and verify the subscriber 202.

After the long-lived certificate is issued in operation 630, the CA continues to monitor if any additional payments which may be due are paid when they are due. Additional payments will come due according to an installment plan because this digital certificate was issued under an installment plan. In embodiments, at least one additional payment for the digital certificates is received in installments according to a payment frequency. The payment frequency can be once every month, once every 3 months, once every 6 months, once every year, etc. By setting payment frequency, the cost for having a digital certificate can be spread out over the life of the certificate, which can relieve the burden of having to pay the entire cost of the digital certificate in one lump sum.

Before another authentication and verification is performed, a decision is made in operation 635 whether the installment payment has been received. If the decision in operation 635 is that all due payments have not been received, the long-lived certificate is revoked in operation 660. If the decision in operation 635 is that all payments are current or the installment payment due has been received, then another decision is made in operation 640. In operation 640, a decision is made whether the authentication period has expired. If the decision in operation 640 is that the authentication period has not expired then the method returns to operation 635 and stays checking for payment until the authentication period has expired. If the decision in operation 640 is that the authentication period has expired, then in operation 645 another decision is made whether the expiration period has expired. If the decision in operation 645 is that the expiration period has expired, then the process ends in operation 665. If the decision in operation 645 is that the expiration period has not expired, then in operation 650 another authentication and verification of the subscriber 202 is performed. The additional authentication and verification in operation 650 is only performed if (1) the authentication period has expired, which means that it is time to perform the additional authentication and verification; (2) the expiration period of the long-lived certification has not expired; and (3) payment for the digital certificate is current. Therefore, the additional authentication and verification performed in operation 650 acts to check the subscriber 202 to ensure that the subscriber 202 is still a valid subscriber 202 that the CA 204 can authenticate and verify. Since payment can be made via various methods, payment is current if there are no outstanding balances. For example, in one embodiment the subscriber 202 can pay for the entire life of the long-lived certificate when the long-lived certificate is issued, in which case the payment would always be current.

After the additional authentication and verification is performed in operation 650, the results of the authentication and verification are analyzed and in operation 655 a decision is made whether the subscriber 202 can still be authenticated and verified. If the decision in operation 655 is that the subscriber 202 cannot be authenticated or verified, then in operation 660 the long-lived certificate is revoked. If the decision in operation 655 is that the subscriber 202 is authenticated and verified then the process continues by going back to operation 635 where a decision is made whether the next installment payment has been received. The method ends in operation 665 after the long-lived certificate is revoked or expired. In operation 660, the CA 204 notifies the subscriber 202 that the long-lived certificate has been revoked.

In another embodiment, a method for managing payment of digital certificates includes receiving a request to issue a digital certificate to a subscriber 202, capturing and saving payment information of the subscriber 202, and performing a first authentication and verification of the subscriber 202 at a first time. Upon determining that the subscriber 202 information obtained in the first authentication and verification is authentic and valid, issuing a long-lived certificate to the subscriber 202, which will expire after an expiration period. Additional authentications and verifications of the subscriber 202 are performed at a first frequency. Upon determining that the subscriber 202 information obtained in any of the additional authentications and verifications is no longer valid, the long-lived certificate is revoked. Upon determining that the subscriber 202 information obtained in the additional authentications and verifications is authentic and valid, the long-lived certificate remains valid. The method further includes receiving payment for use of the long-lived certificate at a payment frequency. The long-lived certificate can be set to last longer than the period specified by the subscriber 202.

If a subscriber 202 chooses to stop using the certificate or terminate a relationship with the CA 204, then the CA 204 would revoke the certificate, and the subscriber 202 would no longer need to pay the CA 204. Moreover, this subscription model allows for a number of options. For example, the subscriber 202 might pay for the certificate every year or every two years, instead of having to pay a large amount up front for a five-year certificate. Alternatively, the CA 204 could bill the subscriber 202 a small amount every month that the certificate was used.

One feature of the invention is breaking the strict dependence among the certificate validity period, payment interval, and authentication and verification interval. In the current state of the art, these are strongly related; i.e., a certificate is valid for a year or two, and at the end of that time, the subscriber 202 must repeat the certificate request and installation process, repeat the payment process, and the CA 204 must repeat the authentication and verification process. By breaking the dependence among these actions, both the CA 204 and the subscriber 202 realize these process improvements.

According to one embodiment, a method for managing payment of digital certificates, includes receiving a request to issue a digital certificate to a subscriber, capturing and saving payment information of the subscriber, performing a first authentication and verification of the subscriber at a first time, and performing at least one additional authentication and verification of the subscriber at least once every authentication period. Upon determining that the subscriber information obtained in the first authentication and verification is authentic and valid, issuing a long-lived certificate to the subscriber. The long-lived certificate is valid for an expiration period. Upon determining that the subscriber information obtained in any of the at least one additional authentication and verification is no longer valid, the long-lived certificate is revoked. The long-lived certificate is revoked if payment is not received during a payment period. The authentication period is shorter than the expiration period and there are at least a first and a second authentication period within the expiration period. The expiration period is longer than the authentication period.

In other embodiments, the first authentication period and the second authentication period can have the same time duration. Alternatively, the first authentication period and the second authentication period can have different time durations.

In yet another embodiment, the first frequency can be different than the payment frequency. Alternatively, the first frequency can be the same as the payment frequency.

In yet another embodiment, the method can further include automatically requesting payment during the payment period from an account number, where the account number is stored with the payment information of the subscriber.

In yet another embodiment, the method can further include receiving payment for the digital certificate before performing the first authentication and verification of the subscriber.

In yet another embodiment, the method can further include receiving payment for continued use of the long-lived certificate after performing the additional authentication and verification of the subscriber.

In yet another embodiment, the method can further include requesting updated information from the subscriber upon determining that the subscriber information obtained in the additional authentication and verification is no longer valid.

In yet another embodiment, the method can further include revoking the digital certificate upon receiving a request to terminate the digital certificate.

In yet another embodiment, the method can further include activating the digital certificate upon receiving payment for a period of time.

In yet another embodiment of the method, the request to issue a digital certificate specifies a requested time period for the digital certificate to expire and the expiration period of the issued long lived digital certificate is set to be longer than the requested time period. In one embodiment the expiration period is set to be five years and the authentication period is eighteen months. The payment period can be three months.

In yet another embodiment, the method can further include leaving active the long-lived certificate for a payment period upon receiving payment.

In yet another embodiment, the authentication period can be different than the payment period. Alternatively, the authentication period can be the same as the payment period.

In yet another embodiment, a method for managing payment of digital certificates, includes receiving a request to issue a digital certificate to a subscriber, capturing and saving payment information of the subscriber, performing a first authentication and verification of the subscriber at a first time, and performing additional authentications and verifications of the subscriber at a first frequency at least once every authentication period. Upon determining that the subscriber information obtained in the first authentication and verification is authentic and valid, issuing a long-lived certificate to the subscriber, wherein the long-lived certificate is set to expire after an expiration period. Upon determining that the subscriber information obtained in any of the additional authentications and verifications is no longer valid, the long-lived certificate is revoked. The expiration period can be longer than the authentication period. The method can further include revoking the long-lived certificate if payment is not received at a payment frequency.

In yet another embodiment, a system includes an ingress, a processor and an egress. The ingress is configured to receive a request to issue a digital certificate to a subscriber and receive an indication of payment of the digital certificate. The processor is configured to capture, and store in a memory, payment information of the subscriber, perform a first authentication and verification of the subscriber at a first time, issue a long-lived certificate to the subscriber if the subscriber information obtained in the first authentication and verification is authentic and valid and if the indication of payment has been received, wherein the long-lived certificate is set to expire after an expiration period, perform additional authentications and verifications of the subscriber at a first frequency at least once per an authentication period, and revoke the long-lived certificate if the subscriber information obtained in any of the additional authentications and verifications is no longer valid. The egress is configured to send the issued digital certificate to the subscriber. The first expiration period is longer than the authentication period. The processor can be further configured to revoke the long-lived certificate if payment is not received at a payment frequency. The processor can also be further configured to generate at the payment frequency a payment request from an account number, wherein the account number is stored in the memory with the payment information of the subscriber. The egress can be further configured to send the payment request to the subscriber.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claim. For example, "single action" events can include selecting a sequence of keys on the mobile device, selecting an image displayed on the mobile device via a touch screen, selecting several buttons at once on the mobile device, etc.

What is claimed is:

1. A method comprising:
receiving a request to issue a digital certificate to a subscriber system;
capturing, by a processor configured to perform digital certificate operations at a certificate authority system, and storing, in a memory at the certificate authority system, subscriber information of the subscriber system;
performing, by the processor, a first authentication and verification of the subscriber information;
issuing, by the processor, a long-lived digital certificate from the certificate authority system to the subscriber system over a network upon determining that the subscriber information in the first authentication and verification is authentic and valid, wherein the long-lived digital certificate is set to expire after an expiration period;
performing, by the processor, additional authentications and verifications of the subscriber information at least once during an authentication period, wherein the expiration period is longer than the authentication period, wherein there are multiple occurrences of the authentication period within the expiration period, wherein the number of authentication periods within the expiration period is determined based at least in part on the length of the expiration period, and wherein the additional authentication and verifications of the subscriber information do not comprise receiving a new request to issue a digital certificate to a subscriber system; and
causing, by the processor, revocation of the long-lived digital certificate at a revocation status database over a network upon determining that the subscriber information in any of the additional authentications and verifications is no longer valid or upon determining that payment is not received during a payment period, wherein the long-lived digital certificate is not reissued upon determining that the subscriber information in the additional authentications and verifications remains valid.

2. The method of claim 1 wherein a first occurrence of the at least once during an authentication period and a second occurrence of the at least once during an authentication period have a same time duration.

3. The method of claim 1 wherein a first occurrence of the at least once during an authentication period and a second occurrence of the at least once during an authentication period have different time durations.

4. The method of claim 1 further comprising automatically requesting payment during the payment period from an account number, wherein the subscriber information comprises payment information, and wherein the account number is stored with the payment information of the subscriber system.

5. The method of claim 1 further comprising receiving payment for the digital certificate before performing the first authentication and verification of the subscriber information.

6. The method of claim 1 further comprising receiving payment for continued use of the long-lived digital certificate after performing one of the additional authentications and verifications of the subscriber information.

7. The method of claim 1 further comprising requesting updated subscriber information from the subscriber system upon determining that the subscriber information in one of the additional authentications and verifications is no longer valid.

8. The method of claim 1 further comprising causing revocation of the long-lived digital certificate at the revocation status database upon receiving a request to terminate the long-lived digital certificate.

9. The method of claim 1 further comprising activating the long-lived digital certificate upon receiving payment for a payment period.

10. The method of claim 1:
wherein the request to issue the digital certificate specifies a requested time period for the digital certificate to expire; and
wherein the expiration period of the long-lived digital certificate is set to be longer than the requested time period.

11. The method of claim 1 wherein the expiration period is set to be five years.

12. The method of claim 1 wherein the authentication period is eighteen months.

13. The method of claim 1 wherein the payment period is three months.

14. The method of claim 1 further comprising activating the long-lived digital certificate for the payment period upon receiving payment.

15. The method of claim 1 wherein the authentication period and the payment period have different time durations.

16. The method of claim 1 wherein the authentication period and the payment period have a same time duration.

17. A method comprising:
receiving a request to issue a digital certificate to a subscriber system;
capturing, by a processor configured to perform digital certificate operations at a certificate authority system, and storing, in a memory at the certificate authority system, subscriber information of the subscriber system;
performing, by the processor, a first authentication and verification of the subscriber information;
issuing, by the processor, a long-lived digital certificate from the certificate authority system to the subscriber system over a network upon determining that the subscriber information in the first authentication and verification is authentic and valid, wherein the long-lived digital certificate is set to expire after an expiration period;
performing, by the processor, additional authentications and verifications of the subscriber information at least once during an authentication period, wherein the expiration period is longer than the authentication period, wherein there are multiple occurrences of the authentication period within the expiration period, wherein the number of authentication periods within the expiration period is determined based at least in part on the length of the expiration period, and wherein the additional authentication and verifications of the subscriber information do not comprise receiving a new request to issue a digital certificate to a subscriber system; and
causing, by the processor, revocation of the long-lived digital certificate at a revocation status database over a network upon determining that the subscriber information in any of the additional authentications and verifications is no longer valid, wherein the long-lived digital certificate is not reissued upon determining that the subscriber information in the additional authentications and verifications remains valid.

18. The method of claim 17 further comprising causing revocation of the long-lived digital certificate at the revocation status database upon determining that payment is not received during a payment period.

19. A system comprising:
an interface at a certificate authority system configured to:
receive a request to issue a digital certificate to a subscriber system;
a processor configured to perform digital certificate operations at the certificate authority system, the operations configured to:
capture and store, in a memory, subscriber information of the subscriber system;
perform a first authentication and verification of the subscriber information;
issue a long-lived digital certificate from the certificate authority system to the subscriber system over a network upon determination that the subscriber information in the first authentication and verification is authentic and valid, wherein the long-lived digital certificate is set to expire after an expiration period;
perform additional authentications and verifications of the subscriber information at least once during an authentication period, wherein the expiration period is longer than the authentication period, wherein there are multiple occurrences of the authentication period within the expiration period, wherein the number of authentication periods within the expiration period is determined based at least in part on the length of the expiration period, and wherein the additional authentication and verifications of the subscriber information do not comprise receiving a new request to issue a digital certificate to a subscriber system; and
cause revocation of the long-lived digital certificate at a revocation status database over a network upon determination that the subscriber information in any of the additional authentications and verifications is no longer valid, wherein the long-lived digital certificate is not reissued upon determination that the subscriber information in the additional authentications and verifications remains valid.

20. The system of claim 19 wherein the processor is further configured to cause revocation of the long-lived digital certificate at the revocation status database upon determination that payment is not received during a payment period.

21. The system of claim 20 wherein:
the processor is further configured to generate during the payment period a payment request from an account number, wherein the subscriber information comprises payment information, and wherein the account number is stored in the memory with the payment information of the subscriber system; and
the processor is further configured to send the payment request to the subscriber system.

22. A non-transitory computer-readable memory having instructions that, when executed by a processor, cause the processor to:
receive a request to issue a digital certificate to a subscriber system;
capture, by a processor configured to perform digital certificate operations at a certificate authority system, and store, in a memory at the certificate authority system, subscriber information of the subscriber system;
perform a first authentication and verification of the subscriber information;
issue a long-lived digital certificate from the certificate authority system to the subscriber system over a network upon determination that the subscriber information in the first authentication and verification is authentic and valid, wherein the long-lived digital certificate is set to expire after an expiration period;
perform additional authentications and verifications of the subscriber information at least once during an authentication period, wherein the expiration period is longer than the authentication period, wherein there are multiple occurrences of the authentication period within the expiration period, wherein the number of authentication periods within the expiration period is determined based at least in part on the length of the expiration period, and wherein the additional authentication and verifications of the subscriber information do not comprise receiving a new request to issue a digital certificate to a subscriber system; and
cause, by the processor, revocation of the long-lived digital certificate at a revocation status database over a network upon determination that the subscriber information in any of the additional authentications and verifications is no longer valid, wherein the long-lived digital certificate is not reissued upon determination that the subscriber information in the additional authentications and verifications remains valid.

* * * * *